United States Patent [19]

Bresolin

[11] Patent Number: 5,750,960
[45] Date of Patent: May 12, 1998

[54] DEVICE FOR HEATING AND MAINTAINING A CONSTANT TEMPERATURE IN A LIQUID, IN PARTICULAR THE WATER OF AQUARIUMS

[76] Inventor: Valerio Bresolin, 9, Via Cornon, Pove Del Grappa, Italy

[21] Appl. No.: 700,666

[22] Filed: Jul. 26, 1996

[30] Foreign Application Priority Data

Aug. 3, 1995 [EP] European Pat. Off. ............ 95830356

[51] Int. Cl.[6] ................................................ H05B 1/02
[52] U.S. Cl. .................. 219/494; 219/523; 219/506; 219/543; 219/510; 392/498; 392/501
[58] Field of Search ............................ 219/523, 494, 219/497, 501, 506, 508, 543, 510; 392/479–481, 497, 498

[56] References Cited

U.S. PATENT DOCUMENTS

| | | |
|---|---|---|
| 2,511,902 | 6/1950 | Cabrera . |
| 4,156,128 | 5/1979 | Craven ................................. 219/523 |
| 4,218,607 | 8/1980 | Noland ................................. 219/301 |
| 4,255,648 | 3/1981 | Willinger et al. . |
| 4,379,220 | 4/1983 | Middleman et al. . |
| 4,667,084 | 5/1987 | Regge ................................. 219/301 |
| 4,983,813 | 1/1991 | Van Tulleken et al. . |

FOREIGN PATENT DOCUMENTS

| | | |
|---|---|---|
| 0379313 | 12/1990 | European Pat. Off. . |
| 92106571 | 4/1992 | European Pat. Off. . |
| 4137322 | 7/1992 | Germany . |
| 1124164 | 12/1992 | Germany . |

*Primary Examiner*—Mark H. Paschall
*Attorney, Agent, or Firm*—Hoffman, Wasson & Gitler

[57] ABSTRACT

A device for heating the water in an aquarium comprises a casing, and housed in the casing, at least one heater element, a thermostat, an electrical circuit by way of which the heater element and thermostat are wired in series to an external power supply, and a control facility for regulating the heater element, which is connected to the thermostat and can be activated from externally of the device; the operation of the heater element is indicated by a lamp. The casing affords at least one internal cavity consisting in a tubular glass wall around which the heater element is wrapped, and having open ends so that the water can pass through.

15 Claims, 3 Drawing Sheets

DEVICE FOR HEATING AND MAINTAINING A CONSTANT TEMPERATURE IN A LIQUID, IN PARTICULAR THE WATER OF AQUARIUMS

FIELD OF THE INVENTION

The present invention relates to a device by means of which a liquid can be heated and maintained at a constant temperature.

In particular, the device disclosed can be used to heat the water of acquariums, and indeed this is the application to which direct reference is made in the present specification, albeit without implying any limitation given that the scope embraces other art fields, such as those pertinent to photographic laboratories and/or studios, where there may be a need for a given volume of liquid to be heated and maintained at substantially constant temperature.

DISCUSSION OF THE PRIOR ART

Conventional heater devices generally comprise a heater element, and an electrical circuit including a thermostat and switch through which the heater element is connected with an external electrical power supply; the components in question are housed in a casing together with means providing control over the device, accessible externally to a user, and will also comprise means by which the operating status of the heater element is indicated visually.

One example of such a heater device, disclosed in Italian patent application n° 30694 B/86, comprises a casing fashioned entirely from glass and shaped as a tube having one end enclosed whilst the opposite end is open and furnished with a cap, the component parts being accomodated by and sealed tightly within the casing in such a way as to enable a substantially total immersion of the device in the liquid to be heated.

Such a solution betrays certain drawbacks deriving essentially from the nature of the material used in the construction of the casing and from the type of heat exchange mechanism: the latter in particular is responsible for a low overall energy efficiency of the device, i.e. low efficiency as regards the transmission of heat.

In effect, the fragile nature of the glass renders the casing intrinsically unsafe and places the user at risk of electrocution, by reason of the manner in which the device is immersed in the water during opeation.

As to the scant effectiveness of the heat exchange, this stems primarily from the fact that for reasons of safety affecting electrical devices of the type intended to operate in contact with liquids, the heater elements are positioned at a given distance from the glass to avoid overheating and fragility induced by thermal shock, so that the conduction component in transmission of the thermal energy is strongly inhibited by the layer of air separating the heater elements physically from the surface through which the heat exchange ultimately occurs. In a second type of solution disclosed in Italian patent application n° VI 94 A 000068, filed by the present applicant, a significantly more effective heat exchange is obtained through the adoption of a particular structure and positional arrangement of the casing around the heater elements, whereby the heater elements can be located in contact with the heat exchange surface while maintaining compliance with all pertinent safety standards.

In both of the existing solutions mentioned above, however, and in traditional appliances generally, the device operates immersed in the liquid and the heat output is radiated unselectively through the casing at the entire mass of liquid to be warmed.

As a result, slow-moving convectional currents are set up within the mass of liquid due to a certain stratification of temperatures around the heater device itself, of which the effects are to inhibit a swift equalization of the heat applied to the mass of liquid and to reduce the thermal gradient in close proximity to the device, thus negatively conditioning the kinetic process by which heat is transmitted.

The serious problem of safety deriving from the intrinsic fragility of the glass remains unsolved, moreover, notwithstanding at least one attempt has been made to address the difficulty by fashioning a casing from plastic material: this solution gave decidedly unsatisfactory results both in terms of energy efficiency, as the already critical problem of heat exchange was made still worse, and in therms of resistance to the stress induced by the thermal cycle, to which must also be added the undersirable effects connected with hydrolysis.

SUMMARY OF THE INVENTION

Accordingly, the object of the present invention is to overcome the drawbacks in quesiton by providing a device capable of ensuring a more effective heat exchange, and thus warming the water more quickly, through an interaction which insofar as it affects the kinetic mechanism of the heat transfer process remains totally independent from the surrounding mass of water.

The stated object is realized in a heater device as characterized in the appended claims, wherein the casing is spanned internally by a tubular cavity compassed within a first wall, externally of which the heater elements are disposed, and open at the two opposite ends in such a way that the liquid to be warmed can pass through.

With the type of structure thus outlined, the heat exchange process involves only a small quantity of liquid contained within the tubular cavity, hence a minimal proportion of the overall mass of liquid to be warmed. In comparison with similar conventional devices, therefore, a given thermal output of the heater elements can be harnessed to generate a more vigorous convectional movement which by reason of the greater velocity of the liquid will enhance the overall coefficient of the heat exchange between the heat-radiating surface and the warmed liquid, thus improving the energy efficiency of the device considerably as a whole.

To advantage, the casing proper comprises a second wall fashioned from plastic material (an insulator of heat and electricity) and disposed in such a way as to encompass the first wall, which is fashioned in glass: an arrangement instrumental not only in obtaining the greater energy efficiency intimated previously, thanks to the greater concentration of heat on the liquid within the cavity, but also in ensuring that the glass wall is securely shielded against accidental impact and thus rendering the device notably more safe than existing devices.

A further advantage afforded by the invention is the option of locating the device externally of the acquarium, not immersed in the liquid, the benefits being that an even more protected position can be selected, in the interests of safety, and that the device can be incorporated into conventional water filter circuits used typically with acquariums.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figures 1, 2:
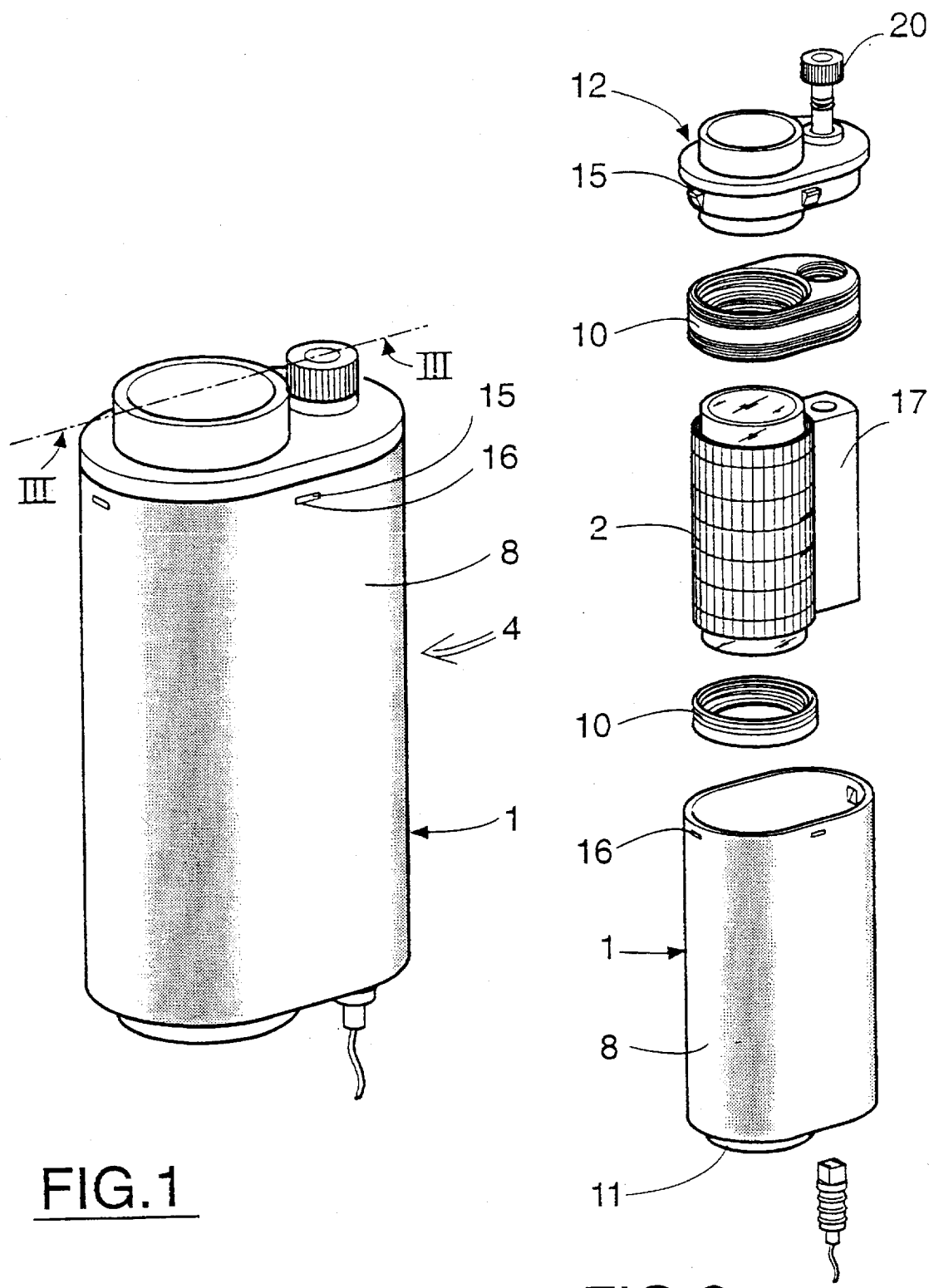
FIG. 1 is a perspective view of a device according to the invention, seen in the assembled state.
FIG. 2 shows the device of FIG. 1 exploded and in perspective.
Figure 3:
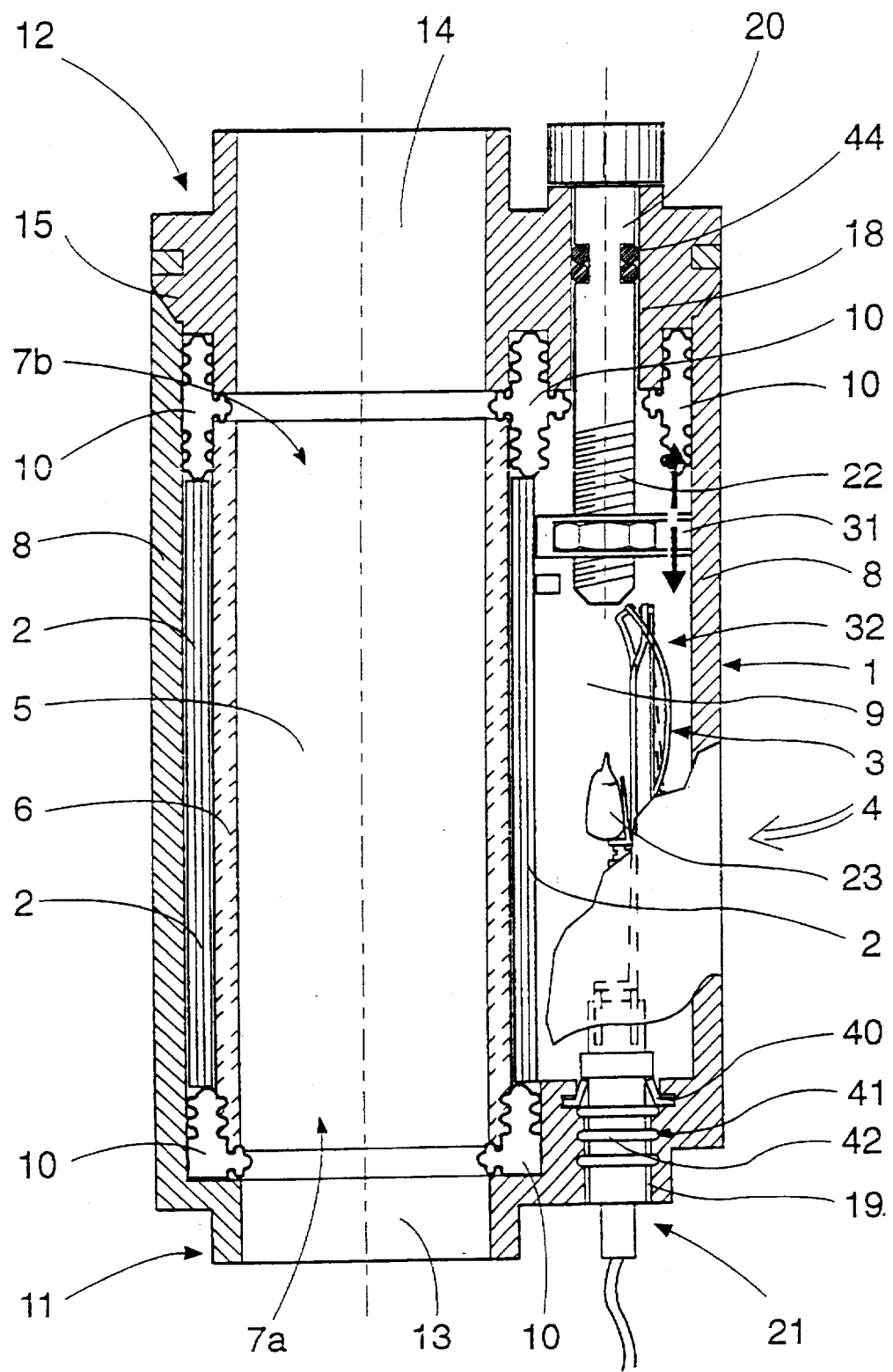
FIG. 3 shows the device of FIG. 1 enlarged and seen in section through III—III.
Figure 4:
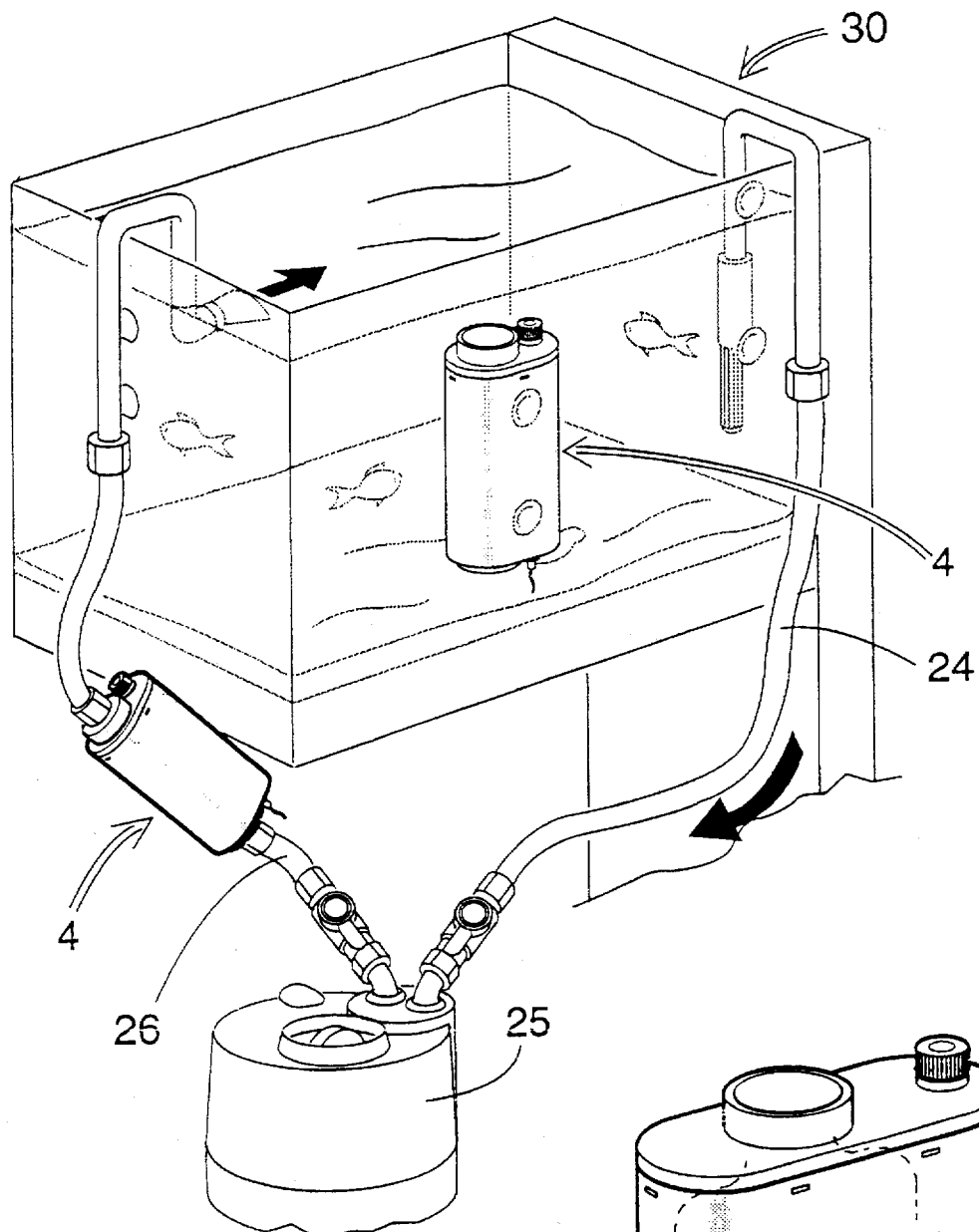
FIG. 4 illustrates two possible applications of the device according to the invention in a conventional acquarium.
Figure 5:
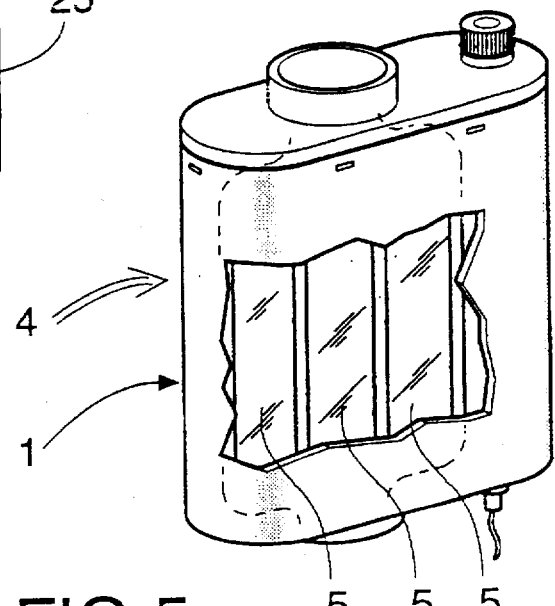
FIG. 5 shows a further possible embodiment of the device according to the invention.

With reference to the accompanying drawings, and to FIGS. 1 and 3 in particular, the present invention relates to a device, denoted 4 in its entirety, for heating water typically in an aquarium (denoted 30 in FIG. 4). Such a device comprises a casing 1, and accommodated internally of the casing, at least one heater element 2, a thermostat 3 and a conventional electrical circuit by which the heater element 2 is connected in series with the thermostat 3 to an external power supply. The device 4 also comprises means 20, 22 and 31 by which to regulate the heater element 2 (potentiometric, for example), connected to the thermostat 3 and capable of activation from externally of the casing 1, and finally, luminous indicator means 23 consisting for example in a lamp wired to the electrical circuit in such a way as to light up and extinguish when the heater element 2 is activated and deactivated, respectively.

The interior of the casing 1 affords a full depth through cavity 5 of tubular embodiment, compassed by a first wall 6 of glass; the heater element 2 is positioned externally of the glass wall 6, and the opposite ends 7a and 7b of the cavity 5 are open in such a manner that the fluid to be warmed can flow through.

The casing 1 also comprises a second wall 8 located externally of and encompassing the first wall 6, the two walls combining with one another to create a void 9 internally of which the heater element 2 is accommodated. The second wall 8 is embodied in a heat insulating and electrically insulating plastic such as Ryton ® or a similar material, and associated with the first wall 6 by way of interposed seals 10 embodied in such a way as to enclose the void 9 in a completely watertight fit.

The casing 1 further comprises a base 11 and a head or cap 12 associated with the opposite ends of the void 9, likewise in a watertight fit, and affording respective through holes 13 and 14 communicating with the cavity 5.

As discernible from FIGS. 2 and 3, the base 11 is rigidly associated with the second wall 8, indeed the two are embodied integrally, whereas the cap 12 is removable and provided accordingly with a set of elastically deformable teeth 15 shaped to engage respective slots 16 afforded by the second wall 8, in such a way that the teeth 15 can be snapped and retained when the cap 12 is fitted to the casing 1.

The void 9 also accommodates the thermostat 3 and the electrical circuit, and to this end, the second wall 8, and more exactly the base 11 and the cap 12 of the casing 1, will incorporate sockets 18 and 19 serving respectively to house a control element 20 forming part of the regulating means and a cable 21 connecting with the power supply, both secured in a watertight fit by means of suitable seals 44.

As regards the embodiment of the heater elements 2, it will be seen from FIG. 2 that these are of the type described in Patent application VI 94 A 000068 filed by the same applicant, essentially comprising foil resistances screen printed onto polyester or some other suitable support and wrapped around the glass wall 6 together with an interposed insulating film, so that the glass tube is ensheathed peripherally by the elements 2.

The thermostat 3 is equipped with a sensing element of suitable type, for example bimetal or electronic but conventional in design at all events, connected electrically to the heater elements 2 and contained internally of a thermostat housing 17 which in its turn is accommodated internally of the void 9; the housing 17 is anchored mechanically to the opposite ends of the heater element 2 and secured tightly to the first wall 6 together with the latter.

FIG. 3 also illustrates the manner of regulating the heater element 2 by way of the control element 20, which comprises a micrometric screw 22 connected to a slider 31 and serves both to vary the electrical resistance and to connect or disconnect the device to or from the power supply; the screw can thus be rotated in either direction as required. Observing the position of the lamp 23 inside the thermostat hosing 17, it will be appreciated immediately that if the screw 22 is embodied in transparent material favouring the transmission of light, the screw 22 itself can be used to indicate the "on" or "off" status of the electrical circuit externally of the device 4, without the need to fashion a window in the casing 1 or to add further dedicated indicator devices.

Still in FIG. 3, the socket 19 at the base of the casing affords a set of grooves 41 in which to seat respective seals 42 encircling the power supply cable 21, and is provided also with a restraining element 40 such as will prevent the cable 21 being tugged from the socket.

As discernible from FIG. 4, finally, the device 4 according to the invention can be operated either immersed directly in the water of the aquarium 30, or coupled into a circuit externally of the tank. In the non-immersed example of FIG. 4, particularly, the device 4 is incorporated into a circuit serving to filter the liquid filling the aquarium 30, which comprises an inlet pipeline 24, a filter unit 25 and an outlet pipeline 26. The device 4 would be located preferably on the outlet pipeline 26.

It will be seen from the foregoing that the object stated at the outset is fully realized in a device as described and illustrated, which also affords the advantages of being easily installed and just as easily removed for inspection and maintenance purposes, not to mention comparatively inexpensive design and construction. Moreover, by adopting a configuration of the device 4 based on a plurality of cavities 5 disposed side by side, parallel with one another and associated with a common thermostat housing 17, it becomes possible to create versions in which the heating potential is significantly expandable, by the addition of modules, to suit the volume of water in different types of aquarium 30.

I claim:

1. A device for heating and maintaining a constant temperature within a liquid, particularly in aquariums, comprising;

at least one heater element comprising a foil resistance screen printed or a dielectric support, a thermostat, an electrical circuit connecting said at least one heater element in series with said thermostat to an external electrical power supply, regulating means for said at least one heater element, connected to said thermostat, luminous means indicating an operating status of said at least one heater element, and a casing housing said at least one heater element, said thermostat, said electrical circuit, and said luminous means, said regulating means being disposed externally of said casing, wherein an interior of said casing has at least one tubular through cavity surrounded by a first wall, said at least one heater element is wrapped externally of said first wall with an interposed insulating film, and wherein opposite ends of said cavity are open so that said liquid to be warmed can pass through.

2. A device as claimed in claim 1, wherein said first wall is fashioned from glass.

3. A device as claimed in claim 1, wherein said casing comprises a second wall encompassing said first wall such that said first and second walls combine to create a fluid-tight void internally of which and heater element at least is accommodated.

4. A device as claimed in claim 3, wherein said second wall is fashioned from a heat insulting and electrically insulating material.

5. A device as claimed in claim 3, further comprising seals located at least between said first wall and said second wall so that said void is a fluid-tight enclosure.

6. A device as claimed in claim 3, wherein said casing further comprises a base and a cap fitted to respective ends of said void in fluid-tight association and affording respective through holes communicating with said cavity.

7. A device as claimed in claim 6, wherein at least one of said base and said cap is integral with said second wall.

8. A device as claimed in claim 6, wherein said base and said cap is furnished with elastically deformable teeth and said second wall affords slots proportioned to accommodate said teeth such that one of said base and said cap can be secured to said second wall in a snap fit.

9. A device as claimed in claim 6, wherein said base and said cap afford corresponding sockets serving respectively to accommodate a control element forming part of said means and to admit a power supply cable.

10. A device as claimed in claim 3, wherein said void also accommodates said thermostat and said electrical circuit, and said second wall affords sockets serving respectively to accommodate an externally accessible control element forming part of said regulating means and to admit a power supply cable, both in a fluid-tight fit.

11. A device as claimed in claim 3, wherein said void also accommodates a thermostat housing connected electrically and mechanically to said heater element and secured together with said heater element, to said first wall.

12. A device as claimed in claim 9 wherein said control element comprises a micrometric screw rotatable within and in fluid-tight association with a corresponding one of said sockets to regulate an output of said heater element.

13. A device as claimed in claim 12, wherein said micrometric screw is embodied in a transparent material capable of transmitting light emitted by said luminous means located internally of said void.

14. A device as claimed in claim 1, coupled into a circuit located externally of an aquarium and serving to circulate said liquid contained therein, where said opposite ends of said cavity are connected respectively to an outlet and an inlet flow directed said circuit.

15. A device as claimed in claim 1, comprising at least two cavities arranged in parallel and associated with respective heater elements.

* * * * *